(12) United States Patent
Takatani et al.

(10) Patent No.: US 6,965,508 B2
(45) Date of Patent: Nov. 15, 2005

(54) SOLID ELECTROLYTIC CAPACITOR AND MANUFACTURING METHOD THEREOF

(75) Inventors: Kazuhiro Takatani, Takatsuki (JP); Mutsumi Yano, Hirakata (JP); Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 14 days.

(21) Appl. No.: 10/810,639

(22) Filed: Mar. 29, 2004

(65) Prior Publication Data

US 2004/0190224 A1 Sep. 30, 2004

(30) Foreign Application Priority Data

Mar. 31, 2003 (JP) ........................................ 2003-097306
Feb. 26, 2004 (JP) ........................................ 2004-051051

(51) Int. Cl.[7] ................................................. H01G 9/00
(52) U.S. Cl. ....................... 361/523; 361/508; 361/516; 361/519; 361/525; 361/528; 29/25.03
(58) Field of Search ................................. 361/523, 508, 361/509, 512, 516, 519, 520, 525, 528, 529, 530; 29/25.03

(56) References Cited

U.S. PATENT DOCUMENTS 4,463,030 A * 7/1984 Deffeyes et al. ............ 427/216
4,780,796 A    10/1988 Fukuda et al.
5,621,608 A *  4/1997 Arai et al. ................... 361/525
5,938,797 A *  8/1999 Fujiwara et al. ............ 29/25.03
6,327,138 B1 * 12/2001 Asami et al. ................ 361/523

FOREIGN PATENT DOCUMENTS

JP          63-173313         7/1988

* cited by examiner

*Primary Examiner*—Anthony Dinkins
*Assistant Examiner*—Nguyen T. Ha
(74) *Attorney, Agent, or Firm*—McDermott Will & Emery LLP

(57) ABSTRACT

A solid electrolytic capacitor has a structure in which a dielectric layer and a metal layer are formed in this order on the surface of an anode. The anode is composed of a porous sinter of tantalum particles. The dielectric layer is composed of a dielectric oxide film formed by anodizing the surface of the anode in an aqueous solution consisting of phosphoric acid, for example. The metal layer is formed by preparing a silver paste by mixing silver particles having an average particle diameter of not larger than 0.05 $\mu$m, a protective colloid, and an organic solvent, and applying the silver paste on the surface of the dielectric layer, and drying the silver paste at a temperature of 150° C. or higher. Further, the anode is connected with an anode terminal, and the metal layer is connected with a cathode terminal through a conductive adhesive.

8 Claims, 3 Drawing Sheets

F I G. 3
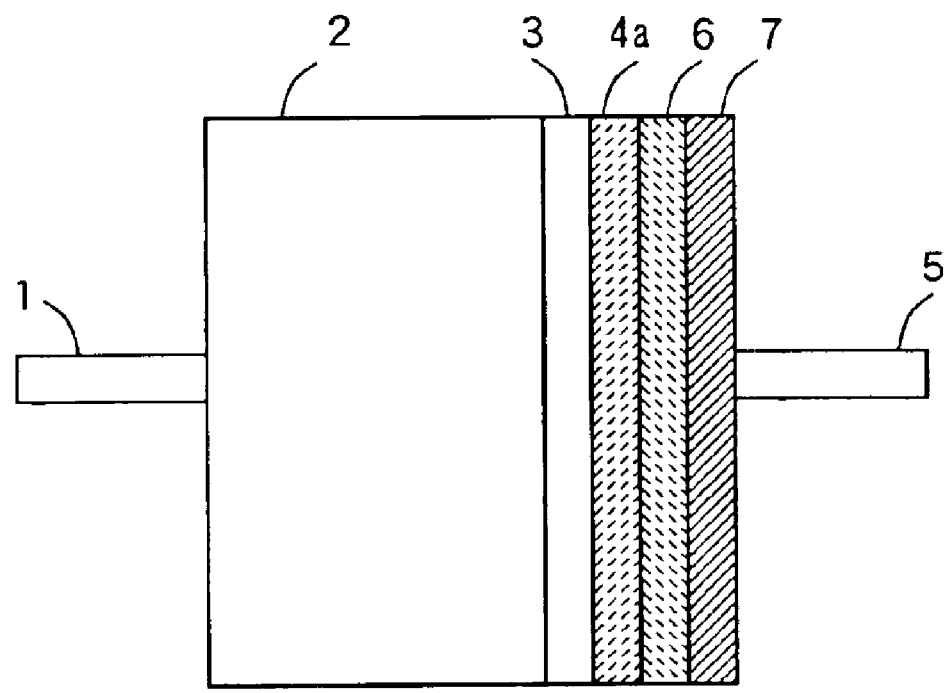

SOLID ELECTROLYTIC CAPACITOR AND MANUFACTURING METHOD THEREOF

BACKGROUND OF THE INVENTION

1. Field of the Invention

The present invention relates to a solid electrolytic capacitor and a manufacturing method thereof.

2. Description of the Background Art

In accordance with recent trend in increasing the frequency of electronic equipment such as personal computers, instantaneous supply of current to electronic circuits is required. For this reason, it is desired to develop solid electrolytic capacitors having a smaller value of equivalent serial resistance (hereinafter referred to as ESR).

It is noted here that the ESR is the sum of dielectric loss, resistivity of an electrolyte, and contact resistance between the electrolyte and a cathode. In a high frequency region, the resistivity of an electrolyte and the contact resistance between the electrolyte and a cathode are predominant.

In general, solid electrolytic capacitors have been in use in which a cathode layer is formed by adhesion of a conductive material, such as manganese dioxide, on the surface of a dielectric layer formed by oxidization of an anode composed of the above-mentioned metal.

Because of the low conductivity of manganese dioxide, however, solid electrolytic capacitors using conductive polymers, such as polypyrrole or polythiophene as electrolytes have been developed (refer to, for example, JP-63-173313-A.)

As mentioned above, the ESR of a solid electrolytic capacitor is mostly dependent upon the resistivity of an electrolyte. However, the conductivities of the above-mentioned conductive polymer materials, such as polypyrrole or polythiophen used as electrolytes are almost equal to those of semiconductors, which are lower than the conductivities of metals by approximately three orders. The conductivity of polypyrrole, for example, is 10 to $10^2$ S/cm$^{-1}$. For this reason, it has been difficult to reduce the ESR in a high frequency region.

SUMMARY OF THE INVENTION

An object of the present invention is to provide a solid electrolytic capacitor having reduced ESR and a method of manufacturing the same.

A solid electrolytic capacitor according to one aspect of the present invention comprises an anode composed of a metal; a dielectric layer composed of an oxide of the metal and formed on the surface of the anode; and a metal layer formed on the surface of the dielectric layer.

In the solid electrolytic capacitor according to the present invention, the metal layer is formed on the surface of the dielectric layer, so that a high-conductive electrolyte can be achieved. As a result, the equivalent serial resistance in a high frequency region is reduced.

The metal layer may be composed of metal particles. In this case, a higher-conductive electrolyte can be achieved. As a result, the equivalent serial resistance is further reduced.

An average particle diameter of the metal particles is preferably not larger than 0.05 μm. This allows the metal particles in the metal layer to be uniformly and closely formed on the surface of the dielectric layer. As a result, the equivalent serial resistance in a high frequency region is reduced.

The average particle diameter of the metal particles is preferably not smaller than 0.01 μm. This avoids a decrease in the conductivity caused by an increase of interfaces of the metal particles. As a result, the equivalent serial resistance in a high frequency region is reduced.

The metal particles preferably includes at least one kind of metal selected from the group consisting of silver, gold, and platinum.

In this case, the conductivity of the metal layer is increased because of the high conductivity of silver, gold or platinum. As a result, the equivalent serial resistance in a high frequency region is reduced.

The metal layer may include a protective colloid. In this case, flocculation of the metal particles which may occur during the preparation of a metal paste is prevented. This allows uniform dispersion of the metal particles in the metal paste, so that the surface of the dielectric layer is uniformly coated with the fine metal particles. As a result, the equivalent serial resistance in a high frequency region is reduced.

The metal layer may be composed of a metal plated layer. In this case, a higher-conductive electrolyte can be achieved. As a result, the equivalent serial resistance in a high frequency region is reduced.

The anode preferably includes at least one kind of metal selected from the group consisting of tantalum, aluminum, niobium, and titanium. The oxides of tantalum, aluminum, niobium, and titanium each have a high relative dielectric constant. This results in large capacitance with small size.

A method of manufacturing a solid electrolytic capacitor according to another aspect of the present invention includes the steps of forming on the surface of an anode composed of a metal a dielectric layer composed of an oxide of the metal; and forming a metal layer on the dielectric layer.

In the method of manufacturing a solid electrolytic capacitor according to the present invention, the metal layer is formed on the surface of the dielectric layer, so that a high-conductive electrolyte can be achieved. As a result, a solid electrolytic capacitor having reduced equivalent serial resistance in a high frequency region can be achieved.

The step of forming the metal layer may include the step of forming the metal layer by metal particles. In this case, a higher-conductive electrolyte can be achieved. As a result, the equivalent serial resistance in a high frequency region is further reduced.

An average particle diameter of the metal particles is preferably not larger than 0.05 μm. This allows the metal particles in the metal layer to be uniformly and closely formed on the surface of the dielectric layer. As a result, the equivalent serial resistance in a high frequency region is reduced.

The average particle diameter of the metal particles is preferably not smaller than 0.01 μm. This avoids a decrease in the conductivity caused by an increase of interfaces of the metal particles. As a result, the equivalent serial resistance in a high frequency region is reduced.

The step of forming the metal layer may include the steps of applying a metal paste including the metal particles on the dielectric layer; and drying the metal paste at a temperature of 150° C. or higher after applying the metal paste.

This makes the contact resistance between the dielectric layer and the metal layer even smaller, thereby further reducing the equivalent serial resistance in a high frequency region.

The step of forming the metal layer may include the steps of preparing a metal paste by mixing the metal particles and a protective colloid in an organic solvent; and applying the metal paste on the surface of the dielectric layer.

In this case, the protective colloid prevents flocculation of the metal particles which may occur in the organic solvent. This allows uniform dispersion of the metal particles in the metal paste, so that the contact resistance between the dielectric layer and the metal layer is made even smaller. As a result, the equivalent serial resistance in a high frequency region is further reduced.

The step of forming the metal layer may include the step of forming the metal layer by metal plating. In this case, a higher-conductive electrolyte can be achieved. As a result, the equivalent serial resistance in a high frequency region is further reduced.

According to the present invention, a high-conductive electrolyte can be achieved. As a result, the equivalent serial resistance in a high frequency region is reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a schematic diagram of a solid electrolytic capacitor prepared in a comparative example 1.

DESCRIPTION OF THE PREFERRED EMBODIMENTS (First Embodiment)

Description will, hereinafter, be made of a solid electrolytic capacitor according to a first embodiment of the present invention and a method of manufacturing the same.

Figure 1:
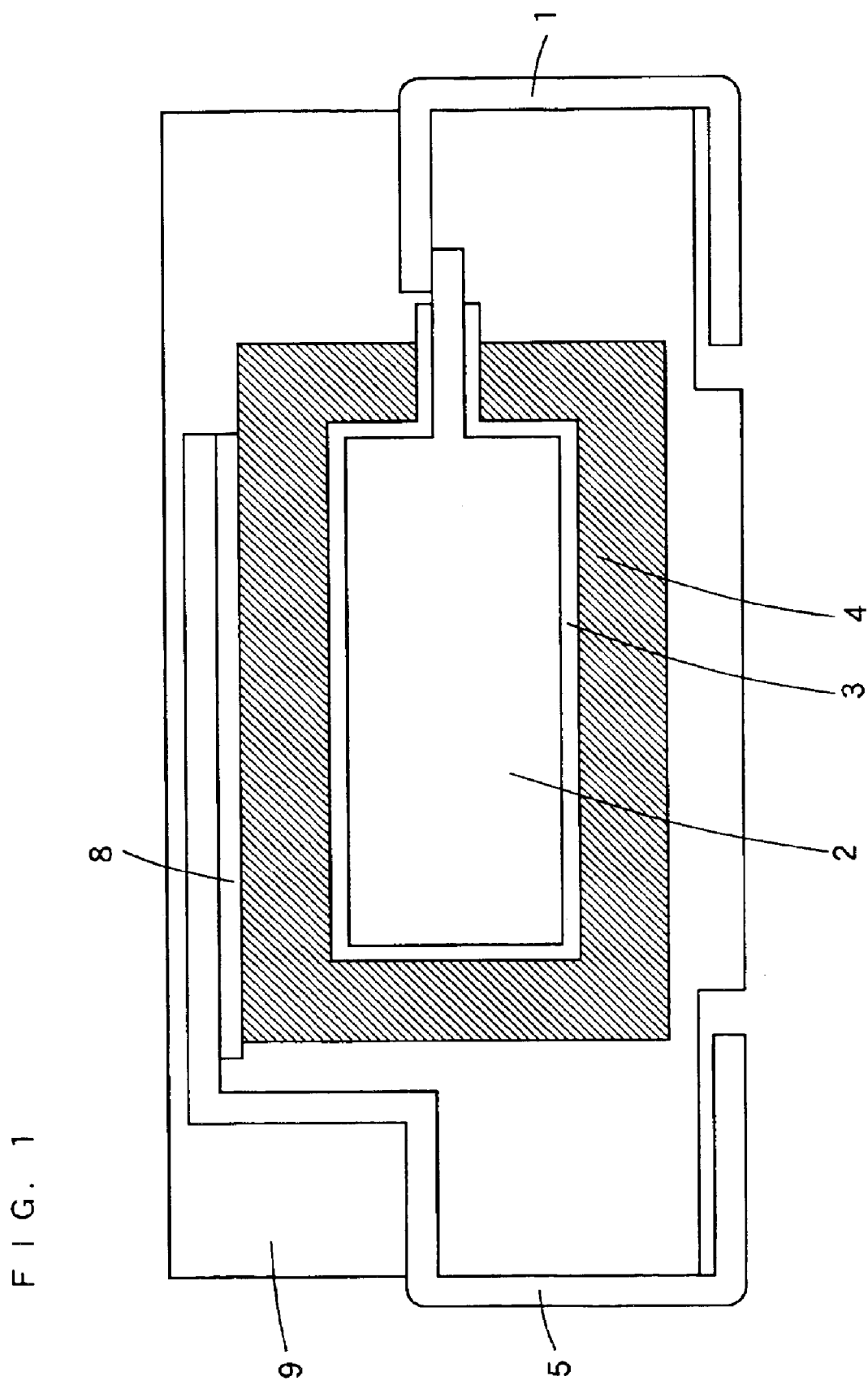
FIG. 1 is a structural diagram of a solid electrolytic capacitor according to one embodiment of the present invention.

FIG. 1 is a structural diagram of a solid electrolytic capacitor according to one embodiment of the present invention.

As shown in FIG. 1, the solid electrolytic capacitor has a structure in which a dielectric layer 3 and a metal layer 4 are formed in this order on the surface of an anode 2.

The anode 2 is connected with an anode terminal 1, and the metal layer 4 is connected with a cathode terminal 5 through a conductive adhesive 8. In addition, a mold sheath resin 9 is formed so that the respective ends of the anode terminal 1 and cathode terminal 5 are projecting outside.

The anode 2 is composed of a porous sinter of tantalum particles. A large surface area of the porous sinter of tantalum particles allows an increase in the capacity. It should be noted that the anode 2 may be composed of any other valve metal particles, such as aluminum, niobium, or titanium particles other than tantalum particles, and may also include two or more kinds of metal particles, such as tantalum, aluminum, niobium, or titanium particles.

The dielectric layer 3 is composed of a dielectric oxide film formed by anodizing the surface of the anode 2 in an aqueous solution of phosphoric acid, for example. In the present embodiment, the dielectric layer 3 is composed of tantalum oxide. Where the anode 2 is composed of a porous sinter of other metal particles, such as aluminum, niobium, or titanium particles, the dielectric layer 3 is composed of an oxide, such as aluminum oxide, niobium oxide, or titanium oxide.

The metal layer 4 is formed by preparing a silver paste by mixing silver particles, a protective colloid, and an organic solvent, and applying the silver paste on the surface of the dielectric layer 3 and drying the silver paste. The method of forming the metal layer 4 will be described below.

The average silver particle diameter is preferably not larger than 0.05 $\mu$m. This allows the silver particles in the metal layer 4 to be uniformly and closely formed on the surface of the dielectric layer 3. As a result, a solid electrolytic capacitor having reduced equivalent serial resistance in a high-frequency region is achieved, as described below.

"Average particle diameter" herein represents the particle diameter at a cumulative value of 50% in the cumulative distribution curve of the particle size distribution.

The average silver particle diameter is preferably not smaller than 0.01 $\mu$m. This avoids a decrease in the conductivity caused by an increase of interfaces of the silver particles. As a result, a solid electrolytic capacitor having reduced equivalent serial resistance in a high-frequency region is achieved. Therefore, it is preferable to use silver particles having an average particle diameter of not smaller than 0.01 $\mu$m nor larger than 0.05 $\mu$m.

While it is preferable to use silver particles as the metal particles in terms of cost, gold particles or platinum particles may also be used in place of silver particles. Alternatively, two or more kinds of metal particles from silver particles, gold particles, and platinum particles may be used.

Description will now be made of a manufacturing method of a solid electrolytic capacitor according to the embodiment of the present invention.

First, an anode 2 composed of a porous sinter is formed by sintering the powder of tantalum particles. In this case, tantalum particles are welded with each other. It should be noted that the powder of other metal particles, such as aluminum, niobium, or titanium particles may also be used.

A dielectric layer 3 is subsequently formed on the surface of the anode 2 by anodizing the anode 2 in an aqueous solution of phosphoric acid.

Meanwhile, silver particles having an average particle diameter of not larger than 0.05 $\mu$m and a protective colloid are mixed at a predetermined weight ratio, and the mixture is mixed with an organic solvent at a predetermined weight ratio to prepare a silver paste.

"Protective colloid" herein represents a hydrophilic colloid to be added in order to increase the stability of a hydrophobic colloid for the electrolyte (*Rikagaku Jiten*, 5th ed.: Iwanami, p. 1300.) The use of a protective colloid allows uniform dispersion of the silver particles in the organic solvent without causing flocculation.

As the protective colloid, polyethyleneimine or the oxidized salt of polyethyleneimine may be used. Alternatively, a compound produced by the reaction of an epoxy compound with an amine compound and prepolymer containing a carboxyl group, a polymer having a plurality of tertiary amino groups or groups having basic cyclic nitride atoms chained to a main chain consisting of polyurethane and polyurea may also be used, for example. As the organic solvent, ethanol, for example, may be used.

Then, the silver paste prepared in the aforementioned manner is applied on the dielectric layer 3. In this case, the silver paste is formed on the surface of the dielectric layer 3 so as to fill the gaps of the dielectric layer 3 on the surface of the porous sinter.

A metal layer 4 is subsequently formed on the dielectric layer 3 by drying the silver paste at a predetermined temperature. The drying temperature is preferably 150° C. or higher. This causes agglomeration of the silver particles in the metal layer 4, thereby increasing the conductivity of the metal layer 4. As a result, the equivalent serial resistance in a high frequency region is further reduced.

The metal layer 4 is then connected with a cathode terminal 5 through a conductive adhesive 8. After that, a mold sheath resin 9 is formed so that the respective ends of an anode terminal 1 and the cathode terminal 5 are projecting outside. The solid electrolytic capacitor is thus prepared.

In the present embodiment, a high-conductive electrolyte is achieved by the formation of the metal layer 4 composed of silver particles on the dielectric layer 3. As a result, a solid electrolytic capacitor having reduced ESR in a high frequency region is achieved.

In addition, the mixture of the silver paste and protective colloid prevents flocculation of the silver particles which may occur during preparation of the silver paste. Accordingly, the silver particles are uniformly dispersed in the silver paste, so that the surface of the dielectric layer 3 can be uniformly and closely coated with the silver paste.

Moreover, applying the silver paste on the surface of the dielectric layer 3, and subsequently drying the silver paste at a temperature of 150° C. or higher causes agglomeration of the silver particles in the silver paste dispersed by the protective colloid. This increases the conductivity of the metal layer 4. As a result, the ESR in a high frequency region is further reduced.

While the sinter of the powder of tantalum, aluminum, niobium, or titanium is used as the anode 2 in the present embodiment, these are not exclusive, and the foils of these metals may also be used, for example.

(Second Embodiment)

Description will, hereinafter, be made of a solid electrolytic capacitor according to a second embodiment of the present invention and a method of manufacturing the same.

The solid electrolytic capacitor according to the present embodiment differs from the solid electrolytic capacitor according to the first embodiment in the structure and formation method of the metal layer 4 as shown below.

In the present embodiment, an anode 2 bearing a dielectric layer 3 is immersed in an ammoniacal silver nitrate solution, and then added with glucose to form a metal layer 4 on the dielectric layer 3 by electroless plating. Note that the ammoniacal silver nitrate solution is produced by adding ammonia water into silver nitrate solution.

In the present embodiment, a high-conductive electrolyte is achieved by the formation of the metal layer 4 on the dielectric layer 3 by electroless plating. As a result, a solid electrolytic capacitor having reduced ESR in a high frequency region is achieved.

Figure 2:
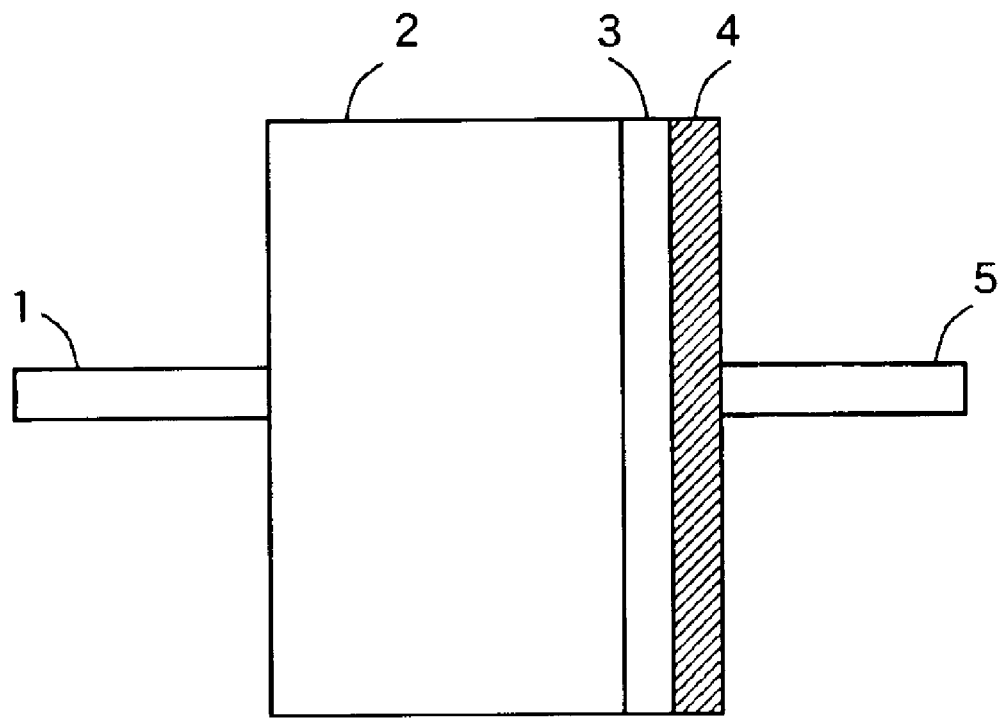
FIG. 2 is a schematic diagram of a solid electrolytic capacitor prepared in inventive examples 1 to 13.

In the following Examples, the solid electrolytic capacitors 100 shown in FIG. 2 were prepared by the manufacturing methods according to the above-mentioned first and second embodiments to evaluate the ESRs. FIG. 2 is a schematic diagram of a solid electrolytic capacitor 100 prepared in inventive examples 1 to 13.

INVENTIVE EXAMPLES 1–7

In the present inventive examples, solid electrolytic capacitors 100 were prepared as shown below in the manufacturing method according to the above-mentioned first embodiment to evaluate the ESRs.

First, in the inventive examples 1 to 7, the solid electrolytic capacitors 100 were prepared in a following method under following conditions by setting the average particle diameters of the silver particles to 0.009 $\mu$m, 0.01 $\mu$m, 0.03 $\mu$m, 0.05 $\mu$m, 0.06 $\mu$m, 0.07 $\mu$m, and 0.09 $\mu$m, respectively.

Using polyethyleneimine as a protective colloid, 70% by weight of silver particles and 30% by weight of polyethyleneimine were mixed. Then, 60% by weight of the mixed substance and 40% by weight of an organic solvent of ethanol were mixed to prepare a silver paste.

Subsequently, an anode 2 composed of a porous sinter was formed by sintering the powder of tantalum particles, and the formed anode 2 was oxidized in an aqueous solution of phosphoric acid to form a dielectric layer 3 composed of a dielectric oxide film on the surface of the anode 2.

The silver paste prepared in the aforementioned manner was then applied on the surface of the dielectric layer 3, and dried at a temperature of 150° C. for thirty minutes to form a metal layer 4. In addition, the anode 2 was connected with an anode terminal 1, and the metal layer 4 was connected with a cathode terminal 5.

INVENTIVE EXAMPLE 8

In the present inventive example, a solid electrolytic capacitor 100 was prepared in the manufacturing method according to the above-mentioned second embodiment to evaluate the ESR.

An anode 2 composed of a porous sinter was formed by sintering the powder of tantalum particles, and the formed anode 2 was oxidized in an aqueous solution of phosphoric acid to form a dielectric layer 3 composed of a dielectric oxide film on the surface of the anode 2.

Subsequently, the anode 2 bearing the dielectric layer 3 was immersed in an ammoniacal silver nitrate solution, and then added with 3% by weight of glucose to form a metal layer 4 on the dielectric layer 3 by electroless plating. Note that the ammoniacal silver nitrate solution is produced by adding 0.15 mol/l of ammonia water into 3 mol/l of silver nitrate solution.

The anode 2 was then connected with an anode terminal 1, and the metal layer 4 was connected with a cathode terminal 5.

COMPARATIVE EXAMPLE

FIG. 3 is a schematic diagram of a solid electrolytic capacitor 101 prepared in a comparative example.

As shown in FIG. 3, in the comparative example, an electrolyte 4a, a carbon layer 6, and a silver layer 7 were laminated in this order on the surface of the dielectric layer 3 prepared in the inventive example 3 to form a solid electrolytic capacitor 101.

Note that the silver layer 7 in the comparative example was formed by applying on the surface of the carbon layer 6 the silver paste composed of silver particles having an average particle diameter of 0.03 $\mu$m prepared in the inventive example 3.

Description will, hereinafter, be made of a manufacturing method of the solid electrolytic capacitor 101 prepared in the comparative example.

First, an anode 2 composed of a porous sinter was formed by sintering the powder of tantalum particles.

Then, a dielectric layer 3 composed of a dielectric oxide film was formed on the surface of the anode 2 by anodizing the anode 2 in an aqueous solution of phosphoric acid.

The surface of the dielectric layer 3 was subsequently coated with an electrolyte 4a composed of polypyrrole by electrolytic polymerization, for example. A carbon paste was then applied on the electrolyte 4a, and dried at a temperature of 150° C. for thirty minutes to form a carbon layer 6.

After that, the silver paste composed of silver particles having an average particle diameter of 0.03 $\mu$m prepared in the inventive example 3 was applied on the surface of the carbon layer 6, and dried at a temperature of 150° C. for thirty minutes to form a silver layer 7. Further, the anode 2 was connected with an anode terminal 1, and the silver layer 7 was connected with a cathode terminal 5. The solid electrolytic capacitor 101 was thus prepared.

(Evaluation)

The solid electrolytic capacitors 100 of the inventive examples 1 to 8 and the solid electrolytic capacitor 101 of the comparative example were each measured for the ESRs at a frequency of 100 kHz using an LCR meter.

Table 1 shows the ESR measurement results of the solid electrolytic capacitors 100 of the inventive examples 1 to 8 and the solid electrolytic capacitor 101 of the comparative example. Note that the respective ESR measurement results of the solid electrolytic capacitors 100 of the inventive examples 1 to 8 are normalized by the ESR measurement result of the solid electrolytic capacitor 101 of the comparative example as 100, and the normalized ESR values are represented in Table 1.

TABLE 1

|                     | Average Silver Particle Diameter ($\mu$m) | ESR |
|---------------------|-------------------------------------------|-----|
| Inventive Example 1 | 0.009                                     | 81  |
| Inventive Example 2 | 0.01                                      | 55  |
| Inventive Example 3 | 0.03                                      | 60  |
| Inventive Example 4 | 0.05                                      | 62  |
| Inventive Example 5 | 0.06                                      | 87  |
| Inventive Example 6 | 0.07                                      | 92  |
| Inventive Example 7 | 0.09                                      | 97  |
| Inventive Example 8 | —                                         | 53  |
| Comparative Example | 0.03                                      | 100 |

In the inventive examples 1 to 8, the ESR values were 97 or lower, which were decreased compared with the ESR value of the comparative example. This shows that the use of the metal layer 4 as an electrolyte greatly decreases the ESR values compared with the case of using the electrolyte 4a composed of polypyrrole.

For the solid electrolytic capacitor of the inventive example 8 using the metal layer 4 formed by electroless plating, in particular, the ESR value was greatly decreased compared with the cases of the inventive examples 1 to 7 using the metal layer 4 composed of silver particles, and that of the comparative example using the electrolyte 4a composed of polypyrrole.

In addition, in the case of the average silver particle diameters of 0.01 $\mu$m to 0.05 $\mu$m, the ESR values resulted in 55 to 62, which were markedly decreased compared with that of the comparative example.

The results above show that it is most preferable to use the metal layer 4 formed by electroless plating, and the average silver particle diameter is preferably 0.01 $\mu$m to 0.05 $\mu$m when using the metal layer composed of silver particles.

INVENTIVE EXAMPLES 9–13

In inventive examples 9 to 13, solid electrolytic capacitors 100 were prepared in the same manner under the same conditions except that the drying temperatures for the silver pastes were set to 140° C., 145° C., 150° C., 160° C., and 170° C., respectively. The inventive example 11 was the same as the above-mentioned inventive example 3.

(Evaluation)

The solid electrolytic capacitors 100 of the inventive examples 9 to 13 were each measured for the ESRs at a frequency of 100 kHz using an LCR meter.

Table 2 shows the ESR measurement results of the solid electrolytic capacitors 100 of the inventive examples 9 to 13. Note that the respective ESR measurement results of the solid electrolytic capacitors 100 of the inventive examples 9 to 13 are normalized by the ESR measurement result of the solid electrolytic capacitor of the inventive example 9 as 100, and the normalized ESR values are represented in Table 2.

TABLE 2

|                      | Drying Temperature (° C.) | ESR |
|----------------------|---------------------------|-----|
| Inventive Example 9  | 140                       | 100 |
| Inventive Example 10 | 145                       | 95  |
| Inventive Example 11 | 150                       | 70  |
| Inventive Example 12 | 160                       | 65  |
| Inventive Example 13 | 170                       | 65  |

The ESR values for the inventive examples 9 and 10 were 100 and 95, respectively. The ESR values for the inventive examples 11 to 13 were 65 to 70, which were markedly decreased compared with those of the inventive examples 9 and 10.

The results above show that the drying temperature for the silver paste is preferably 150° C. or higher.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor comprising:

an anode composed of a metal;

a dielectric layer composed of an oxide of said metal and formed on the surface of said anode; and a metal layer formed on and in direct contact with the surface of said dielectric layer.

2. The solid electrolytic capacitor according to claim 1, wherein said metal layer is composed of metal particles.

3. The solid electrolytic capacitor according to claim 2, wherein an average particle diameter of said metal particles is not larger than 0.05 $\mu$m.

4. The solid electrolytic capacitor according to claim 2, wherein said average particle diameter of said metal particles is not smaller than 0.01 $\mu$m.

5. The solid electrolytic capacitor according to claim 2, wherein said metal particles include at least one kind of metal selected from the group consisting of silver, gold, and platinum.

6. The solid electrolytic capacitor according to claim 1, wherein said metal layer includes a protective colloid.

7. The solid electrolytic capacitor according to claim 1, wherein said metal layer is composed of a metal plated layer.

8. The solid electrolytic capacitor according to claim 1, wherein said anode includes at least one kind of metal selected from the group consisting of tantalum, aluminum, niobium, and titanium.

* * * * *